US012730321B2

(12) United States Patent
Rangaraju et al.

(10) Patent No.: US 12,730,321 B2
(45) Date of Patent: Sep. 8, 2026

(54) REDUCING EYE STRAIN AND IMPROVING PERFORMANCE IN HEADSET DEVICE

(71) Applicant: QUALCOMM Incorporated, San Diego, CA (US)

(72) Inventors: Karthik Rangaraju, San Diego, CA (US); Narasimhan Venkata Agaram, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/864,848

(22) PCT Filed: May 30, 2023

(86) PCT No.: PCT/US2023/067594
§ 371 (c)(1),
(2) Date: Nov. 11, 2024

(87) PCT Pub. No.: WO2024/015657
PCT Pub. Date: Jan. 18, 2024

(65) Prior Publication Data

US 2025/0314888 A1 Oct. 9, 2025

(30) Foreign Application Priority Data

Jul. 14, 2022 (IN) ............................. 202241040363

(51) Int. Cl.
*G02B 27/01* (2006.01)
*G02B 27/00* (2006.01)
*G06F 3/01* (2006.01)

(52) U.S. Cl.
CPC ..... *G02B 27/0172* (2013.01); *G02B 27/0093* (2013.01); *G06F 3/013* (2013.01)

(58) Field of Classification Search
CPC .. G02B 27/0172; G02B 27/0093; G06F 3/013
See application file for complete search history.

(56) References Cited

U.S. PATENT DOCUMENTS 9,357,917 B2 6/2016 Agarwal et al.
12,196,953 B2 * 1/2025 Vankipuram ........... G06F 3/016
(Continued)

OTHER PUBLICATIONS

Crnovrsanin T., et al., "Stimulating a Blink: Reduction of Eye Fatigue with Visual Stimulus", Proceedings of the SIGCHI Conference on Human Factors in Computing Systems, ACM, 2 Penn Plaza, Suite 701 New York 10121-0701 USA, Apr. 26, 2014, pp. 2055-2064, XP058618139, p. 2055-p. 2060.
(Continued)

*Primary Examiner* — Dmitriy Bolotin
(74) *Attorney, Agent, or Firm* — Holland & Hart LLP/Qualcomm

(57) ABSTRACT

This disclosure provides systems, methods, and apparatus, including computer programs encoded on computer-readable media, for inducing eye blinks and aligning background tasks during eye blink durations in a headset device. In some aspects, a headset device may monitor or track eye blinks of a user of the headset device to determine whether to induce an eye blink. The headset device may determine whether the time elapsed since the last eye blink is greater than a time duration threshold. The headset device may modify display characteristics of the headset device to induce a subsequent eye blink if the time elapsed since the last eye blink is greater than the time duration threshold. In some aspects, the headset device may align the performance of one or more background tasks of the headset device during the blink durations of some or all of the eye blinks.

22 Claims, 9 Drawing Sheets

(56) References Cited

U.S. PATENT DOCUMENTS

| | | | | |
|---|---|---|---|---|
| 2015/0324981 | A1* | 11/2015 | Kim | G06T 7/0014 345/619 |
| 2016/0022135 | A1* | 1/2016 | Agarwal | A61B 3/113 351/209 |
| 2016/0140887 | A1* | 5/2016 | Kim | G09G 3/003 345/690 |
| 2016/0334868 | A1* | 11/2016 | Pacheco | G06F 3/013 |
| 2017/0192502 | A1* | 7/2017 | Dmitrieva | G11B 27/007 |
| 2018/0246568 | A1* | 8/2018 | Holz | G06V 40/20 |
| 2021/0244602 | A1* | 8/2021 | Cheng | A61H 5/00 |
| 2023/0248994 | A1* | 8/2023 | Shavit | A61H 23/02 601/18 |
| 2024/0148599 | A1* | 5/2024 | Altman | G02C 7/101 |

OTHER PUBLICATIONS

International Search Report and Written Opinion—PCT/US2023/067594—ISA/EPO—Nov. 3, 2023 (2201277WO).

Partial International Search Report—PCT/US2023/067594—ISA/EPO—Sep. 12, 2023 (2201277WO).

* cited by examiner

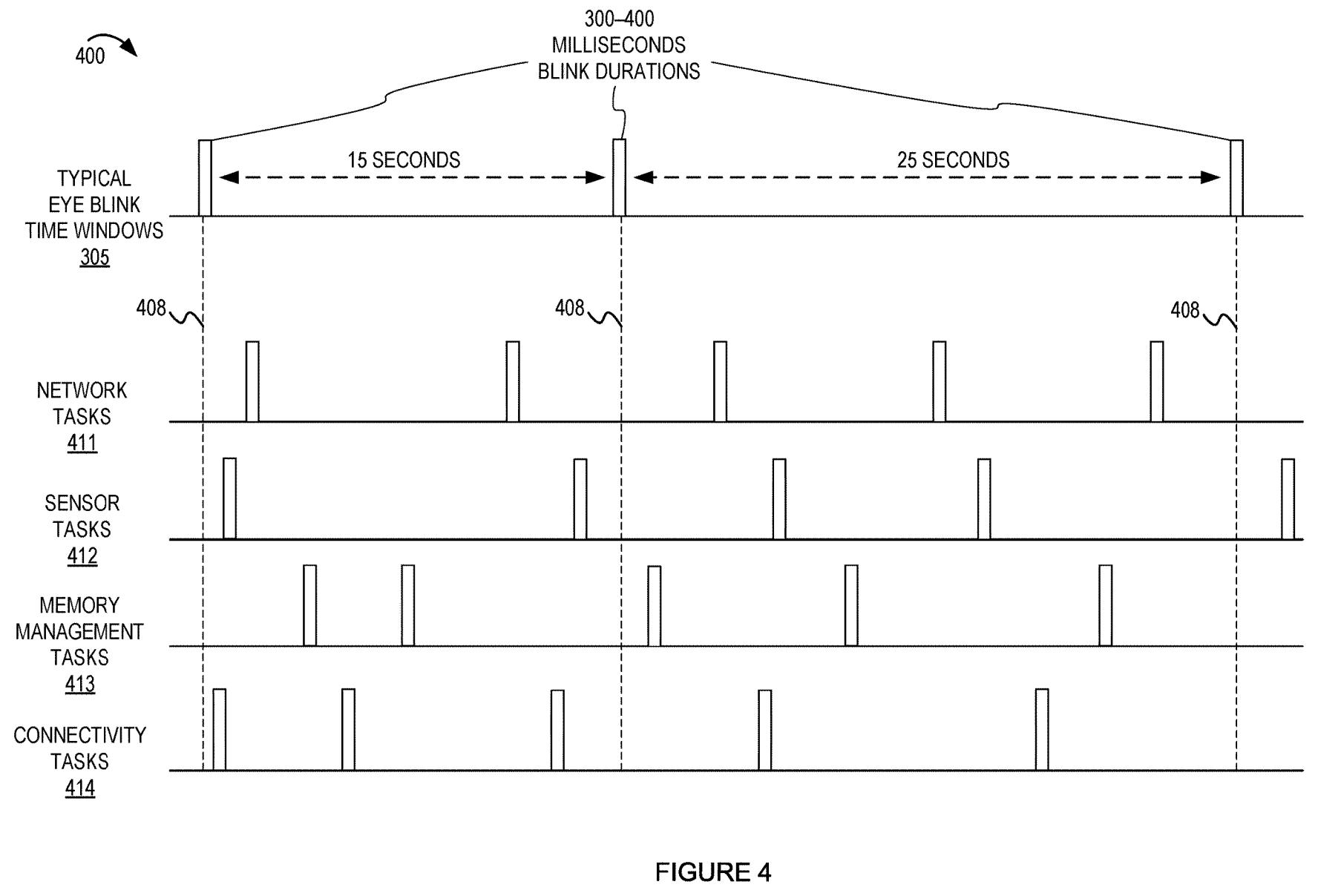

400

TYPICAL EYE BLINK TIME WINDOWS 305

300–400 MILLISECONDS BLINK DURATIONS

15 SECONDS

25 SECONDS

408

408

408

NETWORK TASKS 411

SENSOR TASKS 412

MEMORY MANAGEMENT TASKS 413

CONNECTIVITY TASKS 414

FIGURE 4

REDUCING EYE STRAIN AND IMPROVING PERFORMANCE IN HEADSET DEVICE

CROSS REFERENCES

The present Application is a 371 national stage filing of International PCT Application No. PCT/US2023/067594 by RANGARAJU et al. entitled "REDUCING EYE STRAIN AND IMPROVING PERFORMANCE IN HEADSET DEVICE," filed May 30, 2023; and claims priority to Indian Patent Application No. 202241040363 by RANGARAJU et al., entitled "REDUCING EYE STRAIN AND IMPROVING PERFORMANCE IN HEADSET DEVICE," filed Jul. 14, 2022, each of which is assigned to the assignee hereof, and each of which is expressly incorporated by reference in its entirety herein.

TECHNICAL FIELD

This disclosure generally relates to the field of communication networks, and more particularly, to headset devices in communication networks.

DESCRIPTION OF THE RELATED TECHNOLOGY

Wireless communications systems are widely deployed to provide various types of communication content such as voice, video, packet data, messaging, broadcast, navigation, and so on. These systems may be capable of supporting communication with multiple users by sharing the available system resources (such as time, frequency, and power). The wireless communication systems may include cellular communication systems that may include a number of base stations (BSs), each simultaneously supporting communications for multiple communication devices, which may be otherwise known as user equipment (UE). The wireless communication systems also may include wireless local area networks (WLANs) that may be formed by two or more WLAN devices, which may include at least one station (STA) and at least one access point (AP).

Wireless communication systems may be used by various types of wireless devices, such as mobile phones, gaming consoles, headset devices, desktop computers, smart appliances, security systems, among others. Headset devices may include various types of headset devices, such as augmented, virtual, mixed or extended reality glasses (AR/VR/MR/XR headwear). Headset devices may connect to cellular communication systems and WLANs to provide content to the user while running various types of applications, such as VR gaming applications, AR applications, MR applications or XR applications.

SUMMARY

The systems, methods, and devices of this disclosure each have several innovative aspects, no single one of which is solely responsible for the desirable attributes disclosed herein.

One innovative aspect of the subject matter described in this disclosure can be implemented by a method performed by a headset device. The method may include obtaining an indication of an initial eye blink, and modifying display characteristics of the headset device to induce a subsequent eye blink if a time elapsed since a last eye blink is greater than a time duration threshold.

In some implementations, the method of modifying the display characteristics may include adding a blur effect, a border flashing effect, or a screen flashing effect to one or more regions of a display of the headset device.

In some implementations, the method of modifying the display characteristics may include performing a first modification to the display characteristics of a display of the headset device to induce the subsequent eye blink, and performing a second modification to the display characteristics of the display to induce the subsequent eye blink if the first modification did not induce the subsequent eye blink.

In some implementations, the first modification to the display characteristics may be performed in a non-foveal region of the display and the second modification to the display characteristics may be performed in a foveal region of the display.

In some implementations, the method may further include obtaining an indication of whether the first modification induced the subsequent eye blink within a time window after the first modification, and performing the second modification to the display characteristics of the display if the first modification did not induce the subsequent eye blink within the time window.

In some implementations, the method may further include aligning a performance of one or more background tasks of the headset device during blink durations of a plurality of eye blinks including a first blink duration associated with the initial eye blink and a second blink duration associated with the subsequent eye blink.

Another innovative aspect of the subject matter described in this disclosure can be implemented in a method performed by a headset device. The method may include obtaining an indication of a plurality of eye blinks, and aligning a performance of one or more background tasks of the headset device during blink durations of at least a subset of the plurality of eye blinks.

In some implementations, the one or more background tasks may include one or more of network tasks, sensor tasks, memory management tasks and connectivity tasks.

In some implementations, the method may further include modifying display characteristics of the headset device to induce one or more eye blinks if a time elapsed since a last eye blink is greater than a time duration threshold. The plurality of eye blinks may include the one or more induced eye blinks.

In some implementations, the method may further include modifying display characteristics of the headset device to induce one or more eye blinks in accordance with an eye blink configuration. The plurality of eye blinks may include the one or more induced eye blinks.

Another innovative aspect of the subject matter described in this disclosure can be implemented in a headset device. The headset device may include one or more sensors and one or more processors. The one or more sensors may be configured to obtain an indication of an initial eye blink. The one or more processors may be configured to modify display characteristics of the headset device to induce a subsequent eye blink if a time elapsed since a last eye blink is greater than a time duration threshold.

In some implementations, the one or more processors configured to modify the display characteristics may include the one or more processors configured to perform a first modification to the display characteristics of a display of the headset device to induce the subsequent eye blink, and perform a second modification to the display characteristics of the display to induce the subsequent eye blink if the first modification did not induce the subsequent eye blink.

In some implementations, the one or more processors may be further configured to align a performance of one or more background tasks of the headset device during blink durations of a plurality of eye blinks including a first blink duration associated with the initial eye blink and a second blink duration associated with the subsequent eye blink.

Another innovative aspect of the subject matter described in this disclosure can be implemented in a headset device. The headset device may include one or more sensors and one or more processors. The one or more sensors may be configured to obtain an indication of a plurality of eye blinks. The one or more processors may be configured to align a performance of one or more background tasks of the headset device during blink durations of at least a subset of the plurality of eye blinks.

In some implementations, the one or more processors may be further configured to modify display characteristics of the headset device to induce one or more eye blinks if a time elapsed since a last eye blink is greater than a time duration threshold. The plurality of eye blinks may include the one or more induced eye blinks.

In some implementations, the one or more processors may be further configured to modify display characteristics of the headset device to induce one or more eye blinks in accordance with an eye blink configuration. The plurality of eye blinks may include the one or more induced eye blinks.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 4 shows a conceptual diagram of typical eye blink time windows of users of headset devices and time windows of typical background tasks that are performed by headset devices.

Like reference numbers and designations in the various drawings indicate like elements.

DETAILED DESCRIPTION

Figure 1:
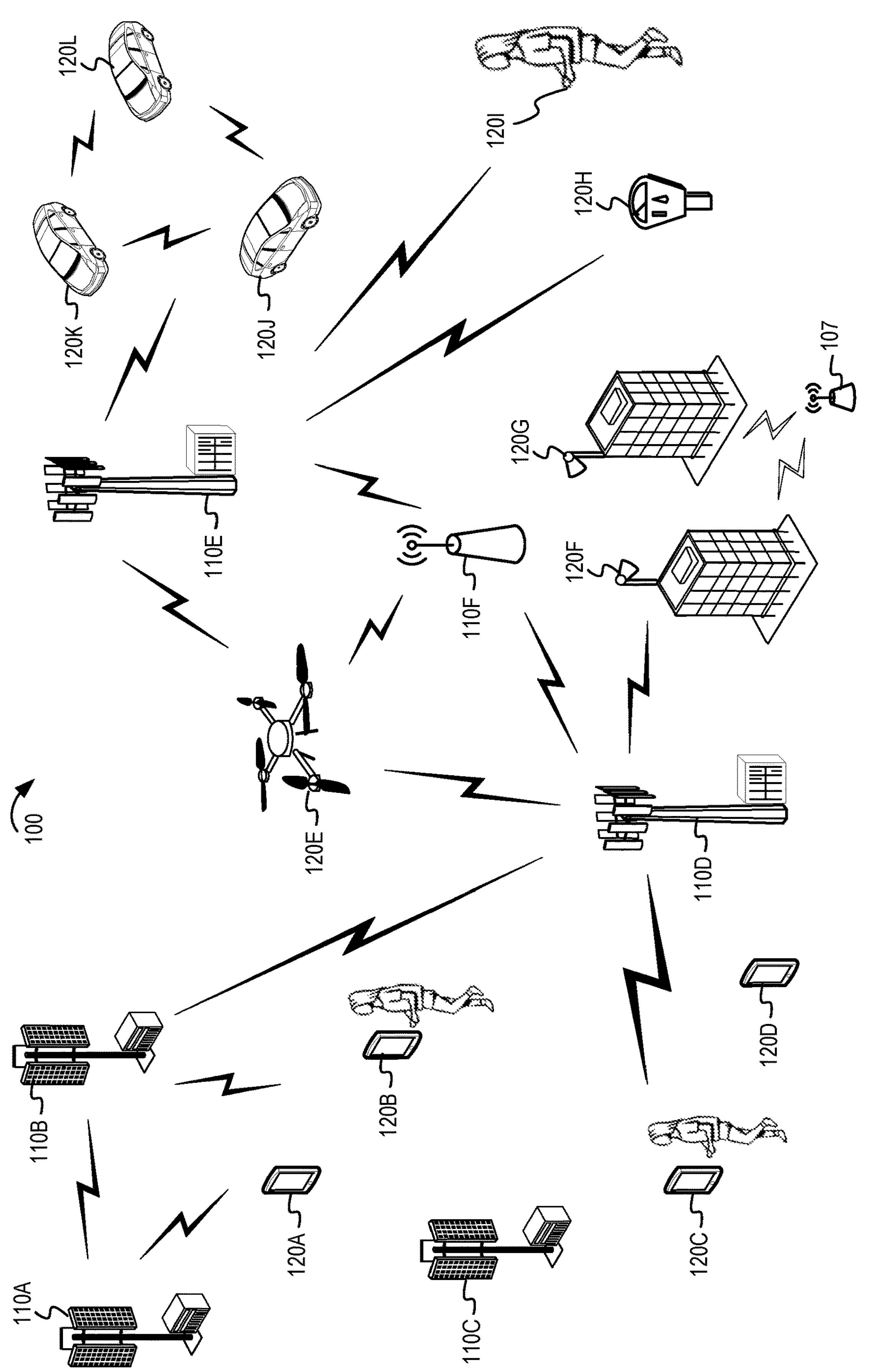
FIG. 1 shows a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

Headset devices, such as augmented reality, virtual reality, mixed reality or extended reality (AR/VR/MR/XR) glasses and other headwear, may cause various types of eye-related conditions to users after prolonged use without adequate eye blinking. For example, prolonged use of headset devices without adequate eye blinking may cause eye strain, blurred vision, dry eyes, headaches, computer vision syndrome, or other types of eye-related conditions. Regular eye blinking may cleanse and nourish the eyes and therefore may reduce the occurrence of eye strain and other eye-related conditions. Headset devices typically reduce the eye blink rate of a user, which increases the time window between successive eye blinks, because the user of the headset device is typically viewing high-intensity and realistic content (such as AR/VR/MR/XR content) in a display that is very close in distance to the user's eyes. Some studies indicate that users of headset devices typically blink once every fifteen to twenty-five seconds (on average), which amounts to an eye blink rate of two to four eye blinks per minute (2-4 eye blinks/minute). To reduce the chances of the eye-related conditions and maintain healthy eyes, some studies indicate that users of headset devices should blink at an eye blink rate of between six and thirty eye blinks per minute (6-30 eye blinks/minute), which amounts to one eye blink every two to ten seconds.

During operation, headset devices perform various types of background tasks, such as memory management tasks, network tasks, sensor tasks, and connectivity tasks, among others. The memory management tasks may include memory cleanup, collection and analysis of memory statistics, and overall memory management. The network tasks may include the collection and analysis of network statistics and status information. The sensor tasks may include the collection and analysis of camera and sensor statistics. The connectivity tasks may include network scans, network changes and handovers, such as changes in access points (APs) or base stations (BSs) and handovers from a wireless wide area network (WWAN) to a wireless local area network (WLAN) or vice versa. Each type of background task is typically performed in its own time interval cycle, which may be random or periodic. Since the background tasks may be performed at various different times, which may occur periodically or randomly, the performance of the background tasks during the operation of the headset device may degrade the performance of the headset device and increase the power consumed by the headset device. For example, the performance of the headset device and the overall user experience may be impacted from display glitches, frame drops, and other display disturbances due to the additional workload requirements to perform the background tasks. Furthermore, the performance of the headset device and the overall user experience may be impacted by the increased power consumption that may be necessary to perform the background tasks. The increased power consumption of the headset device also may reduce battery life and increase the operating temperature of the headset device.

In some implementations, a headset device may be configured to monitor or track eye blinks of a user of the headset device to ascertain, select or determine when to induce one or more eye blinks. The headset device may be configured to modify display characteristics of a display of the headset device to induce one or more eye blinks. The headset device may increase the eye blink rate of a user by inducing one or more eye blinks. In some implementations, the headset device may be configured to align the performance of the background tasks during the blink durations of some or all of the eye blinks. Aligning the background tasks during the blink durations may result in the display glitches and other display disturbances taking place when the user's eyes are partially or fully closed.

In some implementations, a headset device may monitor or track eye blinks of a user of the headset device to ascertain, select or determine whether to induce an eye blink. The headset device may ascertain, select or determine whether the time elapsed since the last eye blink is greater than a time duration threshold. In some implementations, the time duration threshold may be approximately three seconds (~3 seconds). In some implementations, the time duration threshold may be any time duration within the range of approximately two to approximately eight seconds (range of ~2-8 seconds). In some implementations, the headset device may ascertain, select or determine the time duration threshold as a function of one or more of user preferences, display content attributes and the operating attributes of the headset device. The headset device may ascertain, select or determine to induce a subsequent eye blink if the time elapsed since the last eye blink is greater than the time duration threshold. In some implementations, the headset device may modify display characteristics of the headset device to induce the subsequent eye blink if the time elapsed since the last eye blink is greater than the time duration threshold. The modifications to the display characteristics may include adding a blur effect, a border flashing effect, or a screen flashing effect to a display of the headset device. In some implementations, the headset device may perform a first modification to the display characteristics of the headset device to induce the subsequent eye blink. If the first modification does not induce the subsequent eye blink within a time window, the headset device may perform a second modification to the display characteristics of the headset device to induce the subsequent eye blink. In some implementations, the first modification to the display characteristics may be performed in a non-foveal region of the display of the headset device and the second modification to the display characteristics may be performed in a foveal region of the display. A foveal region of the display may be the region of the display where the user's eyes are focusing to view content. A non-foveal region of the display may be one of the regions in the display where the user's eyes are not focusing to view content, such as one of the regions that surround or are in the periphery of the foveal region. In some implementations, the headset device may offer users an option to opt-in and enable (or opt-out and disable) the eye health centric feature of monitoring or tracking eye blinks and modifying display characteristics to induce eye blinks.

In some implementations, the headset device may align the performance of one or more background tasks of the headset device during the blink durations of some or all of the eye blinks. The blink duration, which also may be referred to as blink time, may be the amount of time that elapses for each eye blink. For example, some studies indicate the amount of time an eye blink lasts, on average, may be between approximately three hundred and approximately four hundred milliseconds (~300-400 ms). In some implementations, the background tasks that may be aligned with the blink duration of the eye blinks may be background tasks that can be time shifted (either ahead of the scheduled time or after the scheduled time) with minimal or no performance impact. For example, the background tasks may include one or more of memory management tasks, network tasks, sensor tasks, and connectivity tasks, among others.

Particular implementations of the subject matter described in this disclosure can be implemented to realize one or more of the following potential advantages. Monitoring, detecting or tracking eye blinks of a user of the headset device may help identify, detect, or recognize a poor blink rate that may result in eye-related conditions, such as eye strain and headaches. Modifying the display characteristics of the headset device to induce eye blinks may improve the blink rate and may prevent eye-related conditions. Preventing eye-related conditions may improve the overall user experience and may maintain the user's eye health. Aligning the performance of the background tasks with the blink duration of the user's eye blinks may improve the performance and power consumption of the headset device by reducing the randomness of the execution of the background tasks and increasing the idle time of subsystems that typically perform the background tasks. In addition to execution of background tasks, or in lieu of them, when their execution is not imminent, the headset device may utilize the blink durations to allow the subsystems to enter lower power states and improve system power and thermal behavior. Aligning the performance of the background tasks with the blink duration of the user's eye blinks also may improve the overall user experience by making the display glitches and other display disturbances (that are caused by the additional workload to perform the background tasks) imperceptible to the user of the headset device.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. A BS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used.

A BS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. A BS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. A UE 120 may be a mobile phone, a personal digital assistant (PDA), a wireless modem, a wireless communication device, a handheld device, a wearable device, a headset device, a tablet computer, a laptop computer, a cordless phone, a wireless local loop (WLL) station, a smart appliance, a headset device, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (COMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device or a headset device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I (such as a headset device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
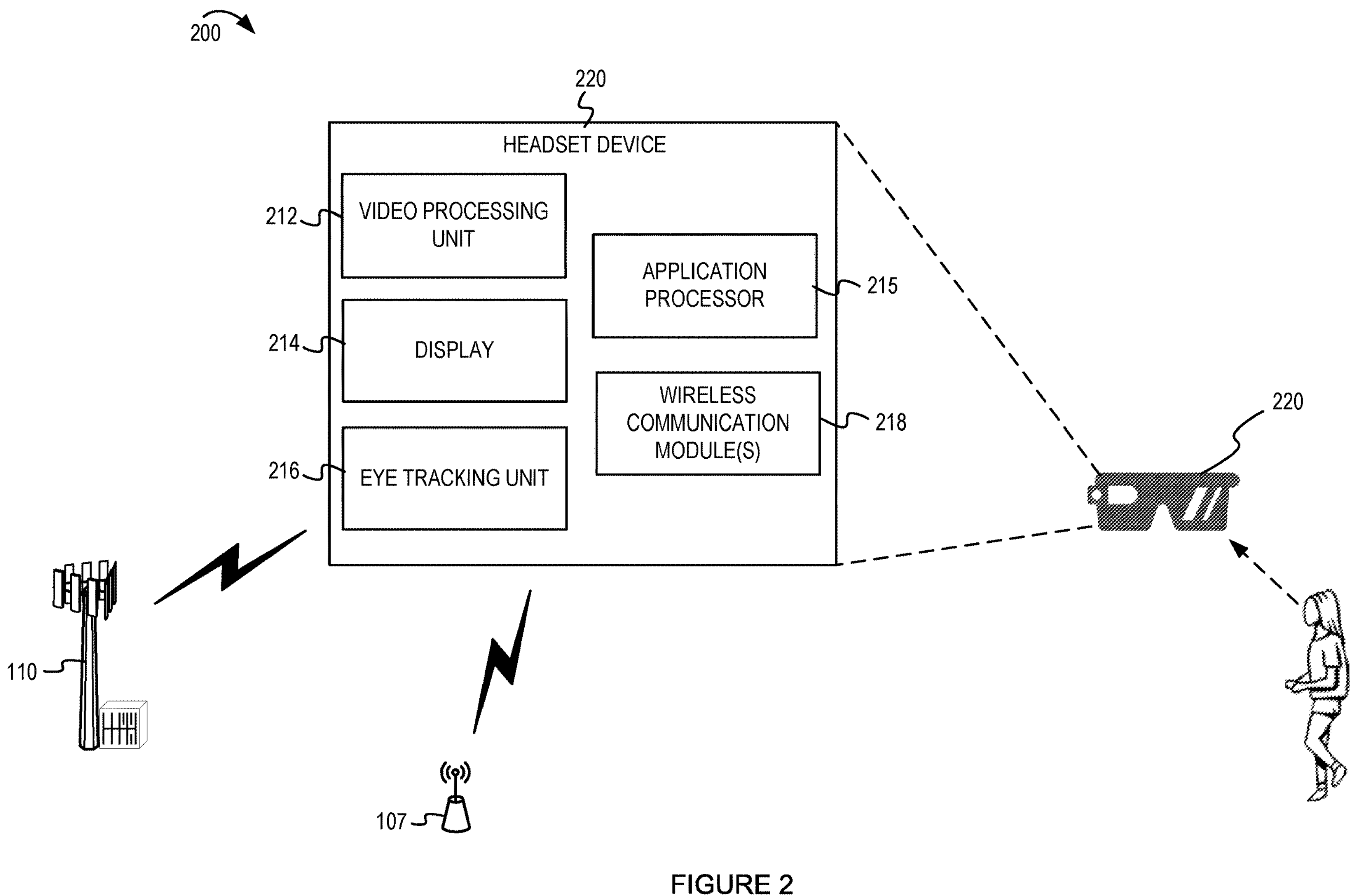
FIG. 2 shows a system diagram of an example headset device configured to modify display characteristics of the headset device to induce eye blinks and align the performance of background tasks during eye blink durations.

FIG. 2 shows a system diagram of an example headset device configured to modify display characteristics of the headset device to induce eye blinks and align the performance of background tasks during eye blink durations. The wireless communication network 200 shown in FIG. 2 may be an example of the wireless communication network 100 described in FIG. 1. The wireless communication network 200 may include a BS 110, an AP 107, and a headset device 220. Although not shown for simplicity, the wireless communication network 200 may include one or more additional BSs, APs, and wireless communication devices, such as headset devices. The headset device 220 may be one of various types of headset devices, such as augmented, virtual or extended reality glasses (AR/VR/MR/XR headwear). A user of the headset device 220 may use the headset device 220 for various applications, such as VR gaming applications, AR applications, MR application or XR applications.

In some implementations, the headset device 220 may include a video processing unit 212, a display 214, an eye tracking unit 216, an application processor 215, and wireless communication modules 218. In some implementations, the eye tracking unit 216 may include eye tracking sensors that monitor, track or detect eye blinks of a user of the headset device 220. The eye tracking unit 216 also may provide an indication of an eye blink to the application processor 215, or the video processing unit 212, or both. The application processor 215 may work in conjunction with the video processor unit 212 to process and present video content on the display 214 of the headset device 220. In some implementations, the application processor 215 also may work in conjunction with the video processor unit 212 to modify display characteristic of the headset device 220 to induce eye blinks, as further described herein. The video processor unit 212 may include one or more video encoding, decoding, graphics, compute engine and rendering modules. In some implementations, the application processor 215 also may align background tasks with the blink durations of some or all of the eye blinks, as further described herein. The wireless communication modules 218 may implement wireless protocols to perform wireless communications, such as cellular communications with the BS 110 and WLAN communications with the AP 107.

In some implementations, the headset device 220 may monitor, detect or track eye blinks of a user of the headset device 220 to ascertain, select or determine whether to induce one or more eye blinks. During operation of the headset device 220, the headset device 220 may detect or obtain an indication of an eye blink and may ascertain, select or determine whether the time elapsed since the eye blink is greater than a time duration threshold. For example, the headset device 220 may detect or obtain an indication of an initial eye blink and may ascertain, select or determine whether the time elapsed since the initial eye blink is greater than the time duration threshold. The headset device 220 may detect or obtain an indication of one or more eye blinks including the initial eye blink and may ascertain, select or determine whether the time elapsed since the last eye blink is greater than the time duration threshold. In some implementations, the eye tracker unit 216 of the headset device 220 may detect each eye blink and may provide an indication of the eye blink to the application processor 215, or the video processor unit 212, or both the application processor 215 and the video processor unit 212. In some implementations, the time duration threshold may be approximately three seconds (~3 seconds). In some implementations, the time duration threshold may be any time duration within the range of approximately two to approximately eight seconds (range of ~2-8 seconds). In some implementations, the headset device may ascertain, select or determine the time duration threshold as a function of one or more of user preferences, display content attributes and the operating attributes of the headset device. In some implementations, the time duration threshold may be ascertained, selected or determined dynamically by one or more machine learning models that consider one or more of display content attributes, content scene characteristic and application inputs based on allowed or not allowed eye blink feedback. In some implementation, if multiple users use the same headset device, then the time duration threshold for a user may be ascertained, selected or determined from on lookup table having multiple time duration thresholds mapped to multiple users. The headset device may ascertain, select, or determine the time duration threshold for the user by accessing the lookup table upon authorization of the user's eyes. The headset device 220 may ascertain, select or determine to induce a subsequent eye blink if the time elapsed since the last eye blink is greater than the time duration threshold. The headset device 220 may induce an eye blink when the time elapsed since the last eye blink is greater than the time duration threshold in order to prevent eye strain, blurred vision, dry eyes, headaches, computer vision syndrome, or other types of eye-related conditions.

In some implementations, the headset device 220 may modify the display characteristics of the headset device 220 to induce an eye blink. For example, the headset device 220 may modify the display characteristics of the headset device 220 to induce an eye blink if the time elapsed since the last eye blink is greater than the time duration threshold, as further described in FIG. 5. The modifications to the display characteristics may include adding a blur effect, a border flashing effect, or a screen flashing effect to one or more regions of a display 214 of the headset device 220. In some implementations, the video processor unit 212 may modify the display characteristics of the headset device 220 to induce an eye blink. In some implementations, the headset device 220 may perform a first modification to the display characteristics of the display 214 of the headset device 220 to induce a subsequent eye blink. The headset device may detect, ascertain, select or determine whether the first modification to the display characteristics induced the subsequent eye blink. For example, the headset device 220 may detect, ascertain, select or determine whether the subsequent eye blink was induced within a time interval from the first modification of the display characteristics. In some implementations, if the first modification does not induce the subsequent eye blink, the headset device 220 may perform a second modification to the display characteristics of the display 214 to induce the subsequent eye blink. In some implementations, the first modification to the display characteristics may be performed in a non-foveal region of the display 214 and the second modification to the display characteristics may be performed in a foveal region of the display 214. A foveal region may be the region of the display 214 where the user's eyes are focusing to view content. A non-foveal region may be one of the regions in the display 214 where the user's eyes are not focusing to view content, such as one of the regions that surround or are in the periphery of the foveal region.

In some implementations, the headset device 220 may perform modifications to the display characteristics of the headset device 220 periodically to induce eye blinks periodically. For example, the headset device 220 may perform modifications to the display characteristics periodically to induce eye blinks at least at the first eye blink rate. For example, the headset device 220 may perform modifications to the display characteristics periodically to induce an eye blink every time interval. In some implementations, the time interval may be approximately three seconds (~3 seconds). In some implementations, the time interval may be any time window within the range of approximately two to approximately eight seconds (range of ~2-8 seconds). In some implementations, the time interval may be configured based on a minimum eye blink rate recommended for eye health. In some implementations, the time interval may be configured based on learned eye blink patterns. For example, the headset device 220 may detect, ascertain, select or determine a first eye blink pattern and may select a first eye blink configuration having a first time interval for the first eye blink pattern, or the headset device 220 may detect, ascertain, select or determine a second eye blink pattern and may select a second eye blink configuration having a second time interval for the second eye blink pattern. For example, a first eye blink pattern may be one eye blink approximately every twenty seconds for approximately one minute, then one eye blink approximately every twelve seconds for approximately two minutes, then one eye blink approximately every twenty seconds for approximately one minute, and so on. A second blink pattern may be one eye blink approximately every fifteen seconds for approximately three minutes and one eye blink approximately every ten seconds for approximately two minutes, and so on. A third blink matter may be a first eye blink after approximately twenty seconds, a second eye blink after approximately fifteen seconds, a third eye blink after approximately twenty seconds, a fourth eye blink after approximately fifteen seconds, and so on. In some implementations, the headset device 220 may select a different time interval configuration for each of the learned eye blink patterns.

In some implementation, the headset device 220 may include a setting that the user can opt-in and enable (or opt-out and disable) for the eye health centric feature of modifying the display characteristics to induce eye blinks. In some implementations, if the headset device 220 is used by multiple users, the headset device 220 also may implement profiles for each user that may store different configurations for each user. For example, the stored configurations may specify whether the eye health centric feature is enabled or disabled for each user, and the time duration threshold for each user. The headset device 220 may identify or detect each user based on biometric or eye authentication or based on login credentials.

In some implementations, the headset device 220 may align the performance of one or more background tasks of the headset device 220 during the blink durations of some or all of the eye blinks. As described herein, the performance of the headset device 220 and user experience may be improved when the background tasks are performed during the blink durations of some or all of the eye blinks. The performance of one or more background tasks may be aligned during the blink durations of some or all of the induced eye blinks and during the blink durations of some or all of the non-induced eye blinks, as further described with reference to FIG. 5. The blink duration, which also may be referred to as blink time, may be the amount of time that elapses for each eye blink. For example, the amount of time an eye blink lasts, on average, may be between approximately three hundred and approximately four hundred milliseconds (~300-400 ms). The eye blinks that are induced by the modification of the display characteristics may be referred to as the induced eye blinks, and the eye blinks that take place when the display characteristic are not being modified (or the eye blinks that are not induced by the modification of the display characteristics) may be referred to as the non-induced eye blinks. In some implementations, the background tasks that may be aligned with the blink duration of the eye blinks may be background tasks that can be time shifted (either ahead of the scheduled time or after the scheduled time) with minimal or no performance impact. In some implementations, the background tasks may include one or more of memory management tasks, network tasks, sensor tasks, and connectivity tasks, among others. The memory management tasks may include memory cleanup, collection and analysis of memory statistics, and overall memory management. The network tasks may include the collection and analysis of network statistics and status information. The sensor tasks may include the collection and analysis of camera and sensor statistics. The connectivity tasks may include network scans, network changes and handovers, such as changes in APs or BSs and changes from a WWAN to a WLAN or vice versa. In some implementations, additional background tasks or different background tasks may be aligned with the blink durations.

As a non-limiting example, the connectivity tasks may include changing from a first communication network (such as a cellular communication network) to a second communication network (such as a WLAN). When the headset device is connected to a cellular communication network, the headset device may detect or receive an indication of a WLAN within a building. The headset device typically switches from the cellular communication network to the WLAN when the user of the headset device walks into the building. In order to align the background tasks, such as the connectivity tasks, with the blink duration of the user's eye blinks, the headset device may delay the switch from the cellular communication network to the WLAN by a few seconds, such as approximately two or three seconds, until the next blink duration. For example, the headset device may delay the connectivity switch until approximately two or three seconds after the user walks into the building. In some implementations, the headset device may ascertain, select or determine whether to perform the connectivity task based on a signal quality measurement. If the signal quality associated with the cellular communications of the headset device is greater than or equal to a signal quality threshold, the headset device may defer the connectivity switch. If the signal quality associated with the cellular communications of the headset device is less than the signal quality threshold, the headset device may perform the connectivity switch during the next blink duration. In some implementations, the signal quality measurements may be one or more of a signal-to-noise ratio (SNR), a received signal strength indicator (RSSI), a reference signal received power (RSRP), and a reference signal received quality (RSRQ).

Figure 3:
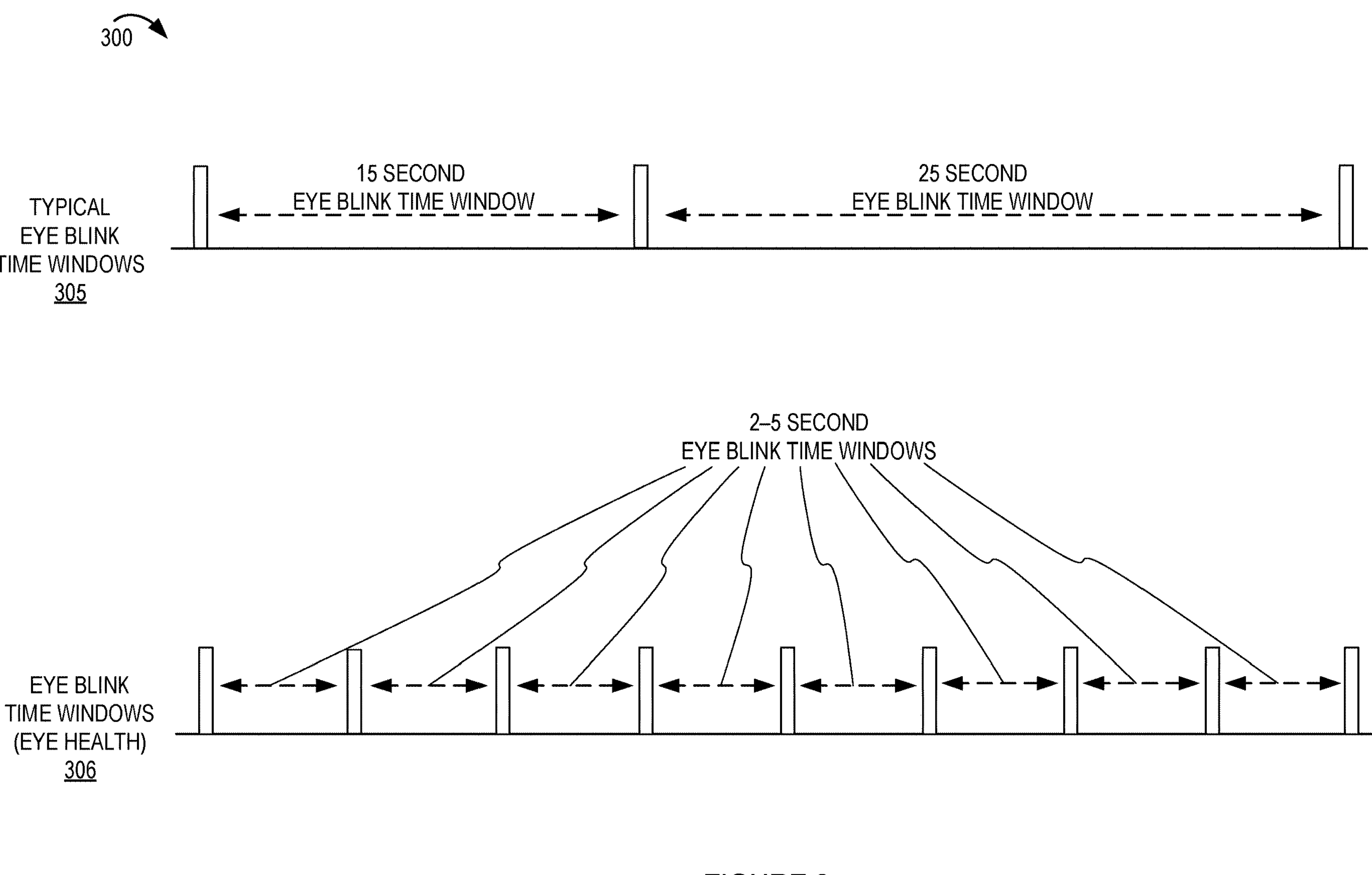
FIG. 3 shows a conceptual diagram of typical eye blink time windows of users of headset devices and eye blink time windows for eye health.

FIG. 3 shows a conceptual diagram 300 of typical eye blink time windows of users of headset devices and eye blink time windows for eye health.

The typical eye blink time windows 305 of users of headset devices (such as headset device 220 of FIG. 2) may be between approximately fifteen to approximately twenty-five seconds (~15-25 seconds). An eye blink time window may refer to the time window or time interval between eye blinks. The eye blink time window of a user of a headset device (such as an AR/VR/MR/XR headset) is usually longer than the eye blink time window of a user that is not using a headset device, because the user of a headset device is typically viewing high-intensity and realistic content (such as AR/VR/MR/XR content) in a display that is very close in distance to the user's eyes. As described herein, some studies indicate an eye blink time window that is longer than approximately ten seconds may cause eye strain, blurred vision, dry eyes, headaches, computer vision syndrome, or other types of eye-related conditions.

Some studies indicate that an eye blink time window of between approximately two to approximately eight seconds (~2-8 seconds) may prevent unhealthy eye-related conditions and maintain eye health. As one non-limiting example, the eye blink time windows 306 for eye health shown in FIG. 3 includes eye blink time windows of between approximately two to approximately five seconds (~2-5 seconds). As another non-limiting example, the eye blink time windows for eye health may include eye blink time windows of between approximately four to approximately eight seconds (~4-8 seconds). The eye blink time window to maintain eye health for a user of a headset device may vary within this range based on the user's eye physiology.

FIG. 4 shows a conceptual diagram 400 of typical eye blink time windows of users of headset devices and time windows of typical background tasks that are performed by headset devices.

As described in FIG. 3, typical eye blink time windows 305 of users of headset devices (such as headset device 220 of FIG. 2) may be between approximately fifteen to approximately twenty-five seconds (~15-25 seconds).

FIG. 4 shows the timing of various background tasks, such as network tasks 411, sensor tasks 412, memory management tasks 413, and connectivity tasks 414. As shown by dashed lines 408 of FIG. 4, the performance of the background tasks are typically not aligned with the blink durations of the eye blinks. The blink durations may be between approximately three hundred and approximately four hundred milliseconds (~300-400 ms). Also, the performance of some of the background tasks (such as the sensor tasks 412) are not aligned with the performance of other background tasks (such as the memory management tasks 413). Thus, as described herein, the performance of the background tasks outside of the blink durations (such as when the user is viewing content on the headset device 220) may impact the performance of the headset device 220 and the overall user experience.

Figure 5:
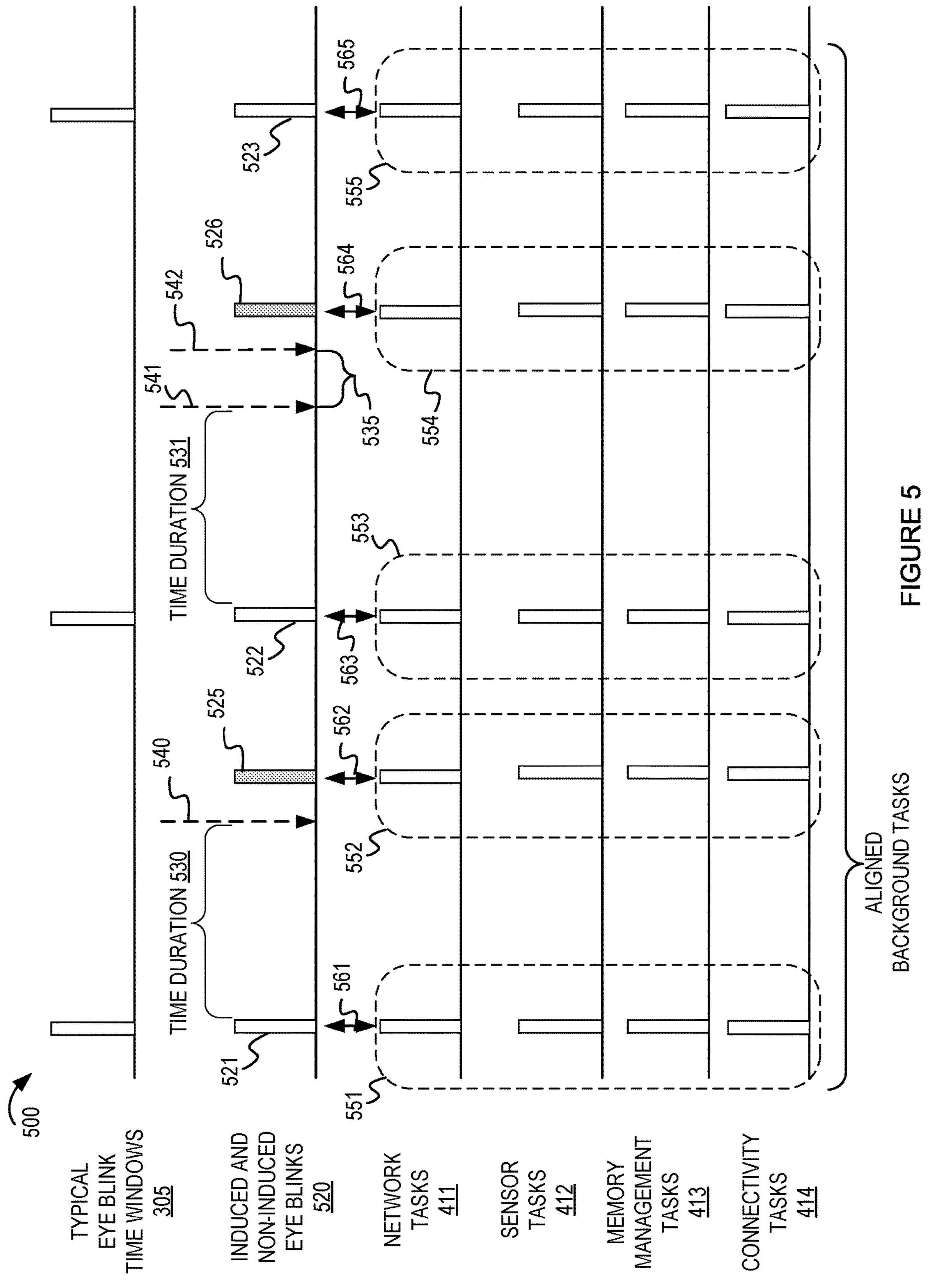
FIG. 5 shows a conceptual diagram of a headset device inducing eye blinks and aligning background tasks with the blink durations of the eye blinks.

FIG. 5 shows a conceptual diagram 500 of a headset device inducing eye blinks and aligning background tasks with the blink durations of the eye blinks.

As described in FIG. 3, typical eye blink time windows 305 of users of headset devices (such as headset device 220 of FIG. 2) may be between approximately fifteen to approximately twenty-five seconds (~15-25 seconds).

As described herein, in some implementations, the headset device 220 may modify the display characteristics of the headset device 220 to induce an eye blink if the time elapsed since the last eye blink is greater than a time duration threshold. As shown in FIG. 5, the induced and non-induced eye blinks 520 may include the non-induced eye blinks 521, 522 and 523 and the induced eye blinks 525 and 526. In some implementations, the headset device 220 may detect, ascertain, select or determine an initial eye blink, which may be the non-induced eye blink 521. The headset device 220 may monitor, ascertain, select or determine the time duration 530 that elapses since the last eye blink, such as the non-induced eye blink 521. If the time duration 530 is greater than the time duration threshold, the headset device 220 may modify the display characteristics of the headset device 220 (as shown by arrow 540) to induce a subsequent eye blink, such as the induced eye blink 525. The headset device 220 may identify or detect the induced eye blink 525 and may continue monitoring or tracking eye blinks. In some implementations, the headset device 220 may determine whether an eye blink is induced (such as the induced eye blink 525) within a time window of the modification to the display characteristics, as further described herein.

In some implementations, the headset device 220 may detect, ascertain, select or determine the next eye blink, which may be the non-induced eye blink 522. The headset device 220 may monitor, ascertain, select or determine the time duration 531 that elapses since the non-induced eye blink 522. If the time duration 531 is greater than the time duration threshold, the headset device 220 may perform a first modification to the display characteristics of the headset device 220 (as shown by arrow 541) to induce a subsequent eye blink. The headset device 220 may monitor, ascertain, select or determine whether a subsequent eye blink is induced within a time window 535 of the first modification to the display characteristics. For example, the time window 535 may be between approximately one and approximately two seconds (~1-2 seconds). If a subsequent eye blink is not identified or detected within the time window 535, the headset device 220 may perform a second modification to the display characteristics (as shown by arrow 542) to induce the subsequent eye blink, such as the induced eye blink 526. The headset device 220 may identify or detect the induced eye blink 526 and may continue monitoring or tracking eye blinks. In some implementations, the first modification to the display characteristics may be performed in a non-foveal region of the display of the headset device 220 and the second modification to the display characteristics may be performed in a foveal region of the display of the headset device 220. For example, the first modification to the display characteristics may be a blur effect in the non-foveal region of the display, and the second modification to the display characteristics may be a flashing effect in the foveal region of the display. As another example, the first modification to the display characteristics may be a blur effect in the non-foveal region of the display, and the second modification to the display characteristics may be a blur effect in the foveal region of the display.

In some implementations, the headset 220 may align one or more background tasks during the blink durations of some or all of the non-induced eye blinks and some or all of the induced eye blinks. The blink durations may be between approximately three hundred and approximately four hundred milliseconds (~300-400 ms). As shown in FIG. 4, a first set of background tasks 551 may be aligned (as shown by arrow 561) during the blink duration of the non-induced eye blink 521, a second set of background tasks 552 may be aligned (as shown by arrow 562) during the blink duration of the induced eye blink 525, a third set of background tasks 553 may be aligned (as shown by arrow 563) during the blink duration of the non-induced eye blink 522, a fourth set of background tasks 554 may be aligned (as shown by arrow 564) during the blink duration of the induced eye blink 526, and a fifth set of background tasks 555 may be aligned (as shown by arrow 565) during the blink duration of the non-induced eye blink 523. As described herein, the background tasks may be one or more of various types of background tasks performed by the headset device 220, such as network tasks 411, sensor tasks 412, memory management tasks 413, and connectivity tasks 414.

In some implementations, instead of monitoring the time duration that has elapsed since the last eye blink to determine whether to modify the display characteristics of the headset device 220, the headset device 220 may induce an eye blink once every time period, according to an eye blink configuration. For example, the headset device 220 may be configured with an eye blink configuration that modifies the display characteristics of the headset device 220 periodically to induce an eye blink every configured time period. For example, the time period may between approximately five and approximately ten seconds (~5-10 seconds). In some implementations, the time interval may be configured based on a minimum eye blink rate recommended for eye health.

Figure 6:
FIG. 6 depicts a flowchart with example operations performed by a headset device to modify display characteristics of the headset device to induce eye blinks.
Figure 6:
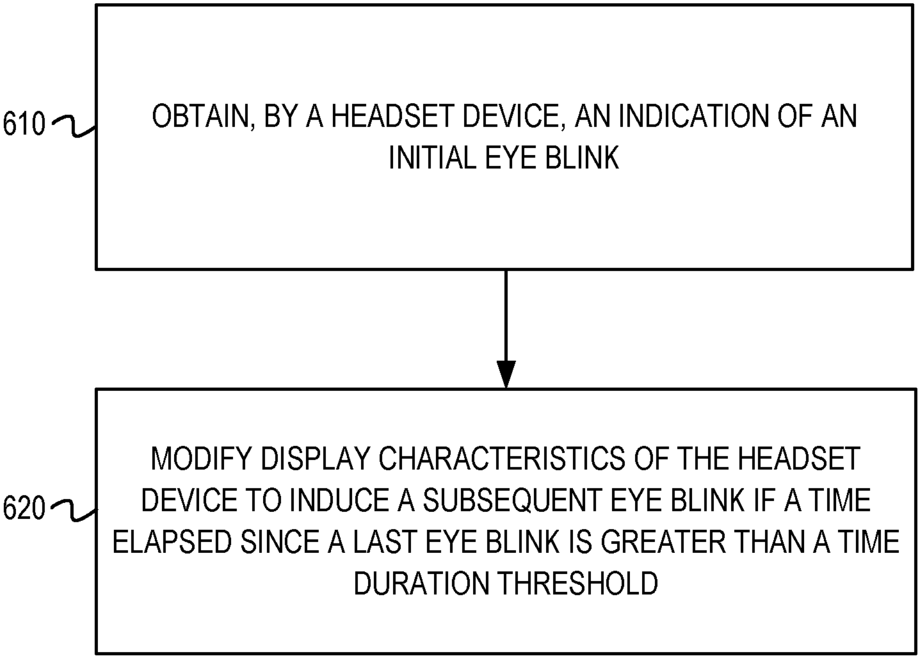

FIG. 6 depicts a flowchart 600 with example operations performed by a headset device to modify display characteristics of the headset device to induce eye blinks.

At block 610, a headset device (such as the headset device 220 shown in FIG. 2) may obtain an indication of an initial eye blink.

At block 620, the headset device may modify display characteristics of the headset device to induce a subsequent eye blink if a time elapsed since a last eye blink is greater than a time duration threshold.

In some implementations, the headset device may perform a first modification to the display characteristics of a display of the headset device to induce the subsequent eye blink. The headset device may obtain an indication of whether the first modification induced the subsequent eye blink within a time window after the first modification. The headset device may perform a second modification to the display characteristics of the display if the first modification did not induce the subsequent eye blink within the time window.

In some implementations, the headset device may align the performance of one or more background tasks of the headset device during blink durations of a plurality of eye blinks including a first blink duration associated with the initial eye blink and a second blink duration associated with the subsequent eye blink.

Figure 7:
FIG. 7 depicts a flowchart with example operations performed by a headset device to align the performance of background tasks during eye blink durations.
Figure 7:
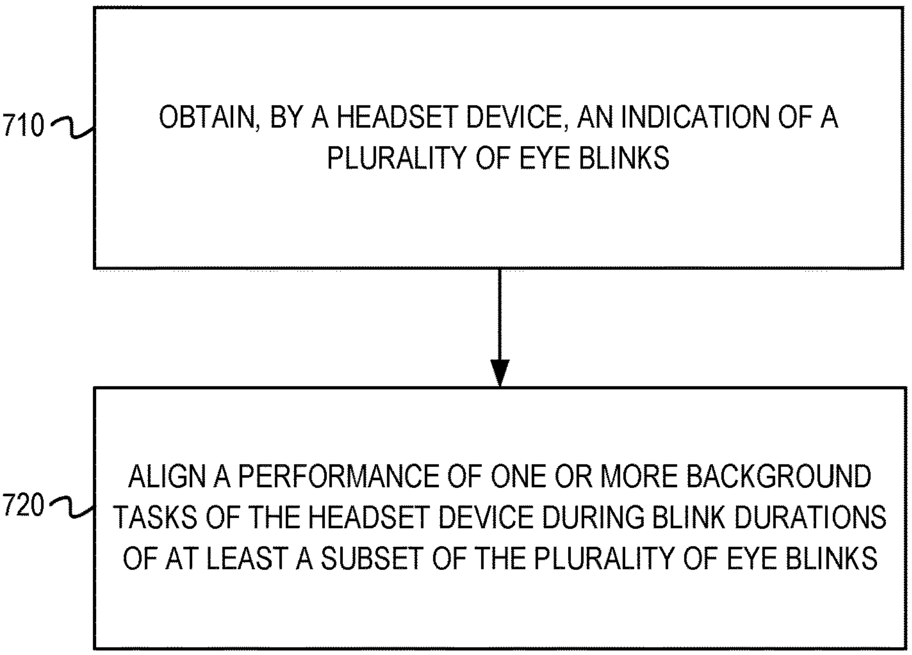

FIG. 7 depicts a flowchart 700 with example operations performed by a headset device to align the performance of background tasks during eye blink durations.

At block 710, a headset device (such as the headset device 220 shown in FIG. 2) may obtain an indication of a plurality of eye blinks.

At block 720, the headset device may align the performance of one or more background tasks of the headset device during the blink durations of at least a subset of the plurality of eye blinks.

In some implementations, the headset device may modify the display characteristics of the headset device to induce one or more eye blinks if a time elapsed since a last eye blink is greater than a time duration threshold. The plurality of eye blinks may include the one or more induced eye blinks.

In some implementations, the headset device may modify the display characteristics of the headset device to induce one or more eye blinks in accordance with an eye blink configuration. The plurality of eye blinks may include the one or more induced eye blinks.

Figure 8:
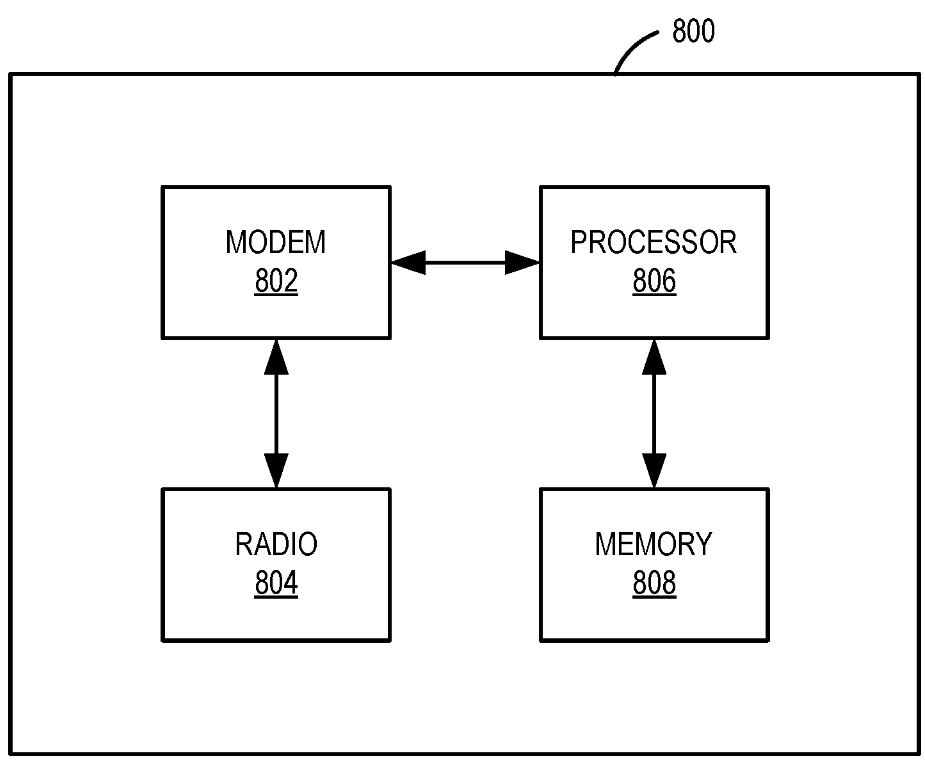
FIG. 8 shows a block diagram of an example wireless communication device.

FIG. 8 shows a block diagram of an example wireless communication device 800. In some implementations, the wireless communication device 800 can be an example of a device for use in a headset device such as the headset device 220 described herein. The wireless communication device 800 may be generally referred to as an apparatus or a wireless communication apparatus. The wireless communication device 800 is capable of transmitting (or outputting for transmission) and receiving wireless communications (for example, in the form of wireless packets). For example, the wireless communication device 800 can be configured to transmit and receive packets in the form of PPDUs and MPDUs conforming to an IEEE 802.11 standard, such as that defined by the IEEE 802.11-2016 specification or amendments thereof including, but not limited to, 802.11ac, 802.11ah, 802.11ad, 802.11ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements (collectively "the processor 806") and one or more memory blocks or elements (collectively "the memory 808"). In some implementations, the processor 806 and the memory 808 may be referred to as the processing system.

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802. In some implementations, the radio 804 and the one or more antennas may form one or more network interfaces (which also may be referred to as "interfaces").

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9:
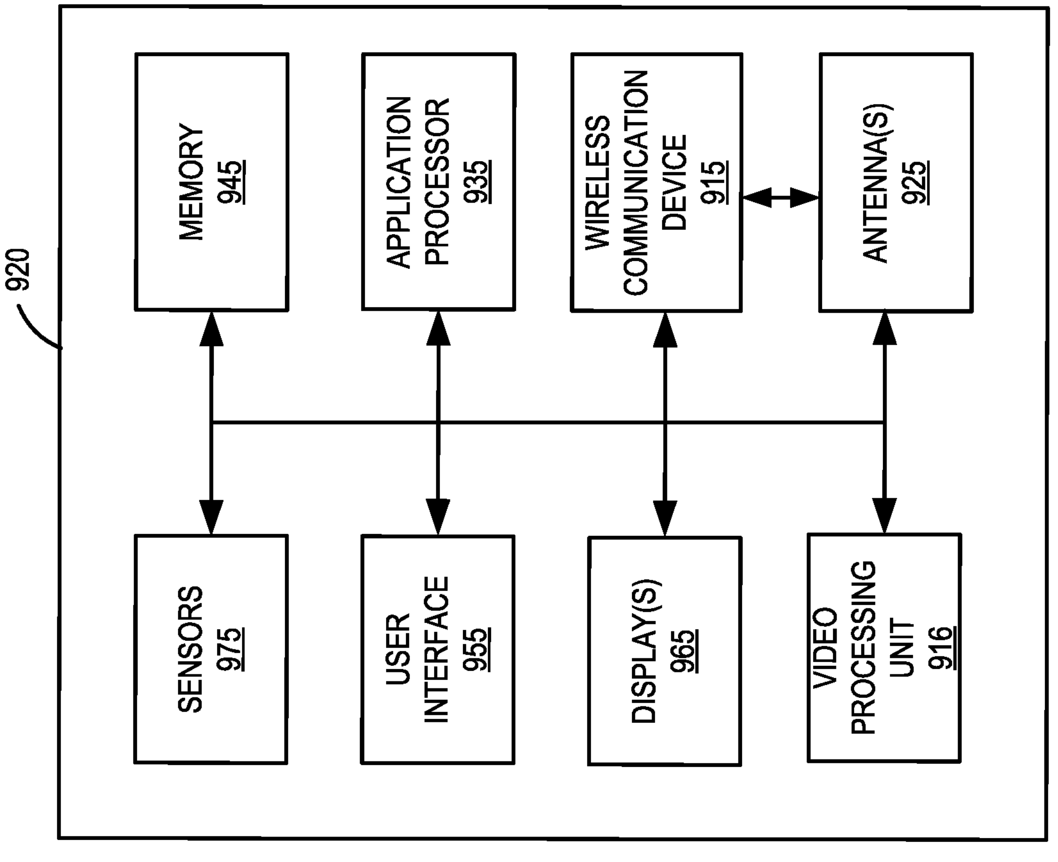
FIG. 9 shows a block diagram of an example headset device.

FIG. 9 shows a block diagram of an example headset device 920. For example, the headset device 920 can be an example implementation of the headset device 220 described herein. The headset device 920 includes a wireless communication device 915. For example, the wireless communication device 915 may be an example implementation of the wireless communication device 800 described with reference to FIG. 8. The headset device 920 may be generally referred to as an apparatus, headset apparatus, or a mobile apparatus. The headset device 920 also includes one or more antennas 925 coupled with the wireless communication device 915 to transmit and receive wireless communications. The headset device 920 additionally includes one or more processors, such as an application processor 935 and a video processing unit 916 coupled with the wireless communication device 915, and a memory 945 coupled with the application processor 935. In some implementations, the headset device 920 further includes a user interface (UI) 955 (such as a keypad) and one or more displays 965. In some implementations, the headset device 920 may further include one or more sensors 975 such as, for example, one or more inertial sensors, accelerometers, temperature sensors, pressure sensors, or altitude sensors. In some implementations, the sensors 975 also may include an eye tracking unit and a camera. Ones of the aforementioned components can communicate with other ones of the components directly or indirectly, over at least one bus. The headset device 920 further includes a housing that encompasses the wireless communication device 915, the application processor 935, the video processing unit 916, the memory 945, and at least portions of the antennas 925, UI 955, and the one or more displays 965.

FIGS. 1-9 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One aspect of the subject matter described in this disclosure can be implemented in a method performed by a headset device. The method may include obtaining an indication of an initial eye blink, and modifying display characteristics of the headset device to induce a subsequent eye blink if a time elapsed since a last eye blink is greater than a time duration threshold.

Clause 2. The method of clause 1, where the method of modifying the display characteristics may include adding a blur effect, a border flashing effect, or a screen flashing effect to one or more regions of a display of the headset device.

Clause 3. The method of any one or more of clauses 1-2, where the method of modifying the display characteristics may include performing a first modification to the display characteristics of a display of the headset device to induce the subsequent eye blink, and performing a second modification to the display characteristics of the display to induce the subsequent eye blink if the first modification did not induce the subsequent eye blink.

Clause 4. The method of any one or more of clauses 1-3, where the first modification to the display characteristics may be performed in a non-foveal region of the display and the second modification to the display characteristics may be performed in a foveal region of the display.

Clause 5. The method of any one or more of clauses 1-4, where the first modification to the display characteristics may be a blur effect and the second modification to the display characteristics may be a flashing effect.

Clause 6. The method of any one or more of clauses 1-5, where the method may further include obtaining an indication of whether the first modification induced the subsequent eye blink within a time window after the first modification, and performing the second modification to the display characteristics of the display if the first modification did not induce the subsequent eye blink within the time window.

Clause 7. The method of any one or more of clauses 1-6, where the method may further include aligning a performance of one or more background tasks of the headset device during blink durations of a plurality of eye blinks including a first blink duration associated with the initial eye blink and a second blink duration associated with the subsequent eye blink.

Clause 8. The method of any one or more of clauses 1-7, where the one or more background tasks may include one or more of network tasks, sensor tasks, memory management tasks, and connectivity tasks.

Clause 9. The method of any one or more of clauses 1-8, where the plurality of eye blinks may include one or more non-induced eye blinks and one or more induced eye blinks.

Clause 10. The method of any one or more of clauses 1-9, where the headset device may be an AR headset, a VR headset, an MR headset or an XR headset.

Clause 11. Another aspect of the subject matter described in this disclosure can be implemented in a method performed by a headset device. The method may include obtaining an indication of a plurality of eye blinks, and aligning a performance of one or more background tasks of the headset device during blink durations of at least a subset of the plurality of eye blinks.

Clause 12. The method of clause 11, where the one or more background tasks may include one or more of network tasks, sensor tasks, memory management tasks and connectivity tasks.

Clause 13. The method of any one or more of clauses 11-12, where the plurality of eye blinks may include one or more non-induced eye blinks and one or more induced eye blinks.

Clause 14. The method of any one or more of clauses 11-13, where the one or more background tasks may include a connectivity task to change from a first communication network to a second communication network.

Clause 15. The method of any one or more of clauses 11-14, where the method may further include modifying display characteristics of the headset device to induce one or more eye blinks if a time elapsed since a last eye blink is greater than a time duration threshold. The plurality of eye blinks may include the one or more induced eye blinks.

Clause 16. The method of any one or more of clauses 11-15, where the method may further include modifying display characteristics of the headset device to induce one or more eye blinks in accordance with an eye blink configuration. The plurality of eye blinks may include the one or more induced eye blinks.

Clause 17. Another aspect of the subject matter described in this disclosure can be implemented in a headset device. The headset device may include one or more sensors and one or more processors. The one or more sensors may be configured to obtain an indication of an initial eye blink. The one or more processors may be configured to modify display characteristics of the headset device to induce a subsequent eye blink if a time elapsed since a last eye blink is greater than a time duration threshold.

Clause 18. The headset device of clause 17, where the one or more processors configured to modify the display characteristics may include the one or more processors configured to add a blur effect, a border flashing effect, or a screen flashing effect to one or more regions of a display of the headset device.

Clause 19. The headset device of clauses 17-18, where the one or more processors configured to modify the display characteristics may include the one or more processors configured to perform a first modification to the display characteristics of a display of the headset device to induce the subsequent eye blink, and perform a second modification to the display characteristics of the display to induce the subsequent eye blink if the first modification did not induce the subsequent eye blink.

Clause 20. The headset device of clauses 17-19, where the first modification to the display characteristics may be performed in a non-foveal region of the display and the second modification to the display characteristics may be performed in a foveal region of the display.

Clause 21. The headset device of clauses 17-20, where the first modification to the display characteristics may be a blur effect and the second modification to the display characteristics may be a flashing effect.

Clause 22. The headset device of clauses 17-21, where the one or more sensors may be configured to obtain an indication of whether the first modification induced the subsequent eye blink within a time window after the first modification. The one or more processors may be configured to perform the second modification to the display characteristics of the display if the first modification did not induce the subsequent eye blink within the time window.

Clause 23. The headset device of clauses 17-22, where the one or more processors may be further configured to align a performance of one or more background tasks of the headset device during blink durations of a plurality of eye blinks including a first blink duration associated with the initial eye blink and a second blink duration associated with the subsequent eye blink.

Clause 24. The headset device of clauses 17-23, where the one or more background tasks may include one or more of network tasks, sensor tasks, memory management tasks, and connectivity tasks.

Clause 25. The headset device of clauses 17-24, where the plurality of eye blinks may include one or more non-induced eye blinks and one or more induced eye blinks.

Clause 26. The headset device of clauses 17-25, where the headset device may be an AR headset, a VR headset, an MR headset or an XR headset.

Clause 27. Another aspect of the subject matter described in this disclosure can be implemented in a headset device. The headset device may include one or more sensors and one or more processors. The one or more sensors may be configured to obtain an indication of a plurality of eye blinks. The one or more processors may be configured to align a performance of one or more background tasks of the headset device during blink durations of at least a subset of the plurality of eye blinks.

Clause 28. The headset device of clause 27, where the one or more background tasks may include one or more of network tasks, sensor tasks, memory management tasks and connectivity tasks.

Clause 29. The headset device of clauses 27-28, where the plurality of eye blinks may include one or more non-induced eye blinks and one or more induced eye blinks.

Clause 30. The headset device of clauses 27-29, where the one or more background tasks may include a connectivity task to change from a first communication network to a second communication network.

Clause 31. The headset device of clauses 27-30, where the one or more processors may be further configured to modify display characteristics of the headset device to induce one or more eye blinks if a time elapsed since a last eye blink is greater than a time duration threshold. The plurality of eye blinks may include the one or more induced eye blinks.

Clause 32. The headset device of clauses 27-31, where the one or more processors may be further configured to modify display characteristics of the headset device to induce one or more eye blinks in accordance with an eye blink configuration. The plurality of eye blinks may include the one or more induced eye blinks.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, units, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, units, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a headset device, comprising:

obtaining an indication of an initial eye blink;

modifying display characteristics of the headset device to induce a subsequent eye blink if a time elapsed since a last eye blink is greater than a time duration threshold;

wherein the modifying the display characteristics includes:

performing a first modification to the display characteristics in a non-foveal region of a display of the headset device to induce the subsequent eye blink; and performing a second modification to the display characteristics in a foveal region of the display of the headset device to induce the subsequent eye blink if the subsequent eye blink is not detected within a time window after the first modification to the display characteristics.

2. The method of claim 1, wherein the modifying the display characteristics includes adding a blur effect, a border flashing effect, or a screen flashing effect to one or more regions of a display of the headset device.

3. The method of claim 1, wherein the first modification to the display characteristics is a blur effect and the second modification to the display characteristics is a flashing effect.

4. The method of claim 1, further comprising:

obtaining an indication of whether the subsequent eye blink is detected within the time window after the first modification; and performing the second modification to the display characteristics of the display if the indication is that the subsequent eye blink is not detected within the time window.

5. The method of claim 1, wherein the headset device is an augmented reality (AR) headset, a virtual reality (VR) headset, a mixed reality (MR) headset or an extended reality (XR) headset.

6. The method of claim 1, wherein the time window is between approximately one second and approximately two seconds.

7. The method of claim 1, wherein the headset device comprises an eye tracking sensor, and wherein the foveal region corresponds to a region of the display where an eye of a user is focusing to view content.

8. The method of claim 1, wherein the first modification to the display characteristics is a first blur effect and the second modification to the display characteristics is a second blur effect.

9. The method of claim 1, further comprising:

modifying the display characteristics of the headset device to induce one or more eye blinks in accordance with an eye blink configuration.

10. The method of claim 1, further comprising:

receiving a user selection to enable a modification of the display characteristics to induce eye blinks, wherein modifying the display characteristics is in accordance with the user selection.

11. The method of claim 1, wherein the time duration threshold is:

a function of a user preference, a display content attribute, an operating attribute of the headset device, or any combination thereof;

in accordance with one or more machine learning models that consider the display content attribute, a content scene characteristic, an application input associated with allowed or not allowed eye blink feedback, or any combination thereof; or specific to a user of the headset device in accordance with a mapping between a plurality of time duration thresholds and a plurality of users.

12. A headset device, comprising:

one or more sensors configured to obtain an indication of an initial eye blink;

one or more processors configured to modify display characteristics of the headset device to induce a subsequent eye blink if a time elapsed since a last eye blink is greater than a time duration threshold;

wherein the modifying the display characteristics includes the one or more processors configured to:

perform a first modification to the display characteristics in a non-foveal region of a display of the headset device to induce the subsequent eye blink; and perform a second modification to the display characteristics in a foveal region of the display of the headset device to induce the subsequent eye blink if the subsequent eye blink is not detected within a time window after the first modification to the display characteristics.

13. The headset device of claim 12, wherein the one or more processors configured to modify the display characteristics includes the one or more processors configured to add a blur effect, a border flashing effect, or a screen flashing effect to one or more regions of a display of the headset device.

14. The headset device of claim 12, wherein the first modification to the display characteristics is a blur effect and the second modification to the display characteristics is a flashing effect.

15. The headset device of claim 12, wherein:

the one or more sensors are configured to obtain an indication of whether the subsequent eye blink is detected within the time window after the first modification; and the one or more processors are configured to perform the second modification to the display characteristics of the display if the indication is that the subsequent eye blink is not detected within the time window.

16. The headset device of claim 12, wherein the headset device is an augmented reality (AR) headset, a virtual reality (VR) headset, a mixed reality (MR) headset or an extended reality (XR) headset.

17. The headset device of claim 12, wherein the time window is between approximately one second and approximately two seconds.

18. The headset device of claim 12, wherein the one or more sensors comprise an eye tracking sensor, and wherein the foveal region corresponds to a region of the display where an eye of a user is focusing to view content.

19. The headset device of claim 12, wherein the first modification to the display characteristics is a first blur effect and the second modification to the display characteristics is a second blur effect.

20. The headset device of claim 12, wherein the one or more processors are configured to modify the display characteristics of the headset device to induce one or more eye blinks in accordance with an eye blink configuration.

21. The headset device of claim 12, wherein the one or more processors are configured to receive a user selection to enable a modification of the display characteristics to induce eye blinks, wherein modifying the display characteristics is in accordance with the user selection.

22. The headset device of claim 12, wherein the time duration threshold is:

a function of a user preference, a display content attribute, an operating attribute of the headset device, or any combination thereof;

in accordance with one or more machine learning models that consider the display content attribute, a content scene characteristic, an application input associated with allowed or not allowed eye blink feedback, or any combination thereof; or specific to a user of the headset device in accordance with a mapping between a plurality of time duration thresholds and a plurality of users.

* * * * *